Dec. 16, 1947.   T. J. SMULSKI   2,432,689
AUTOMATIC BLADE CLIP
Original Filed Feb. 26, 1942   2 Sheets-Sheet 1
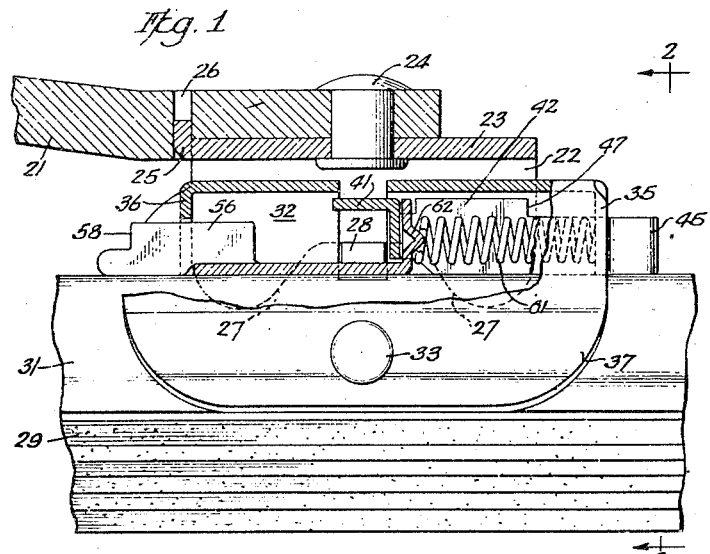
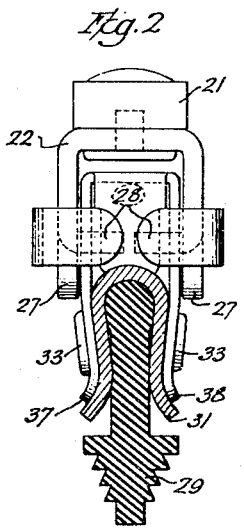
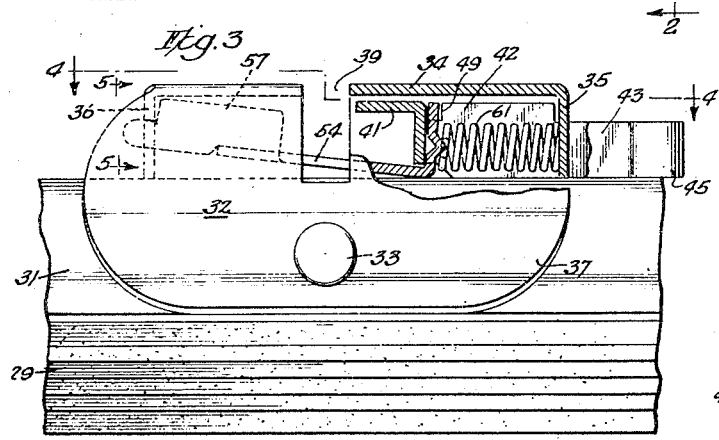
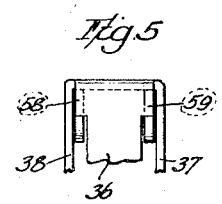
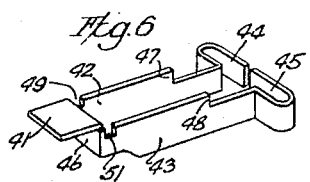
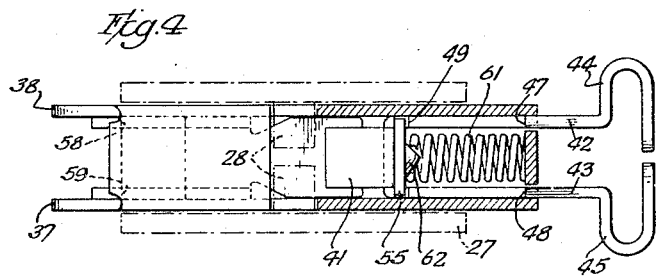
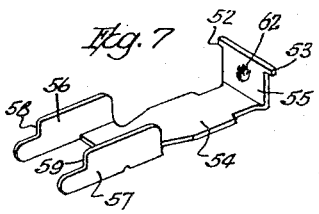
Inventor
Theodore J. Smulski Dec. 16, 1947.  T. J. SMULSKI  2,432,689
AUTOMATIC BLADE CLIP
Original Filed Feb. 26, 1942    2 Sheets-Sheet 2
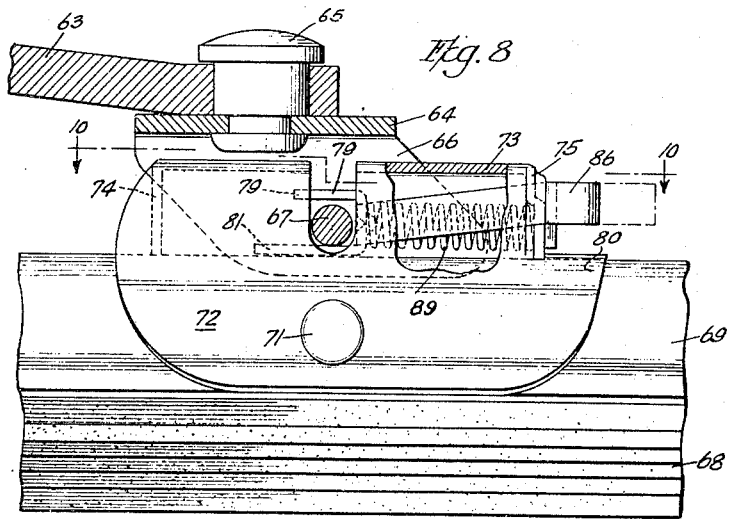
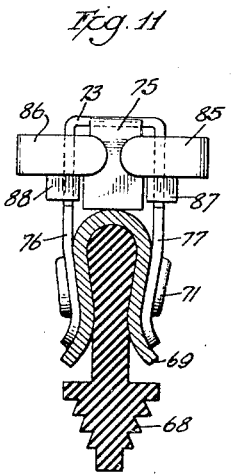
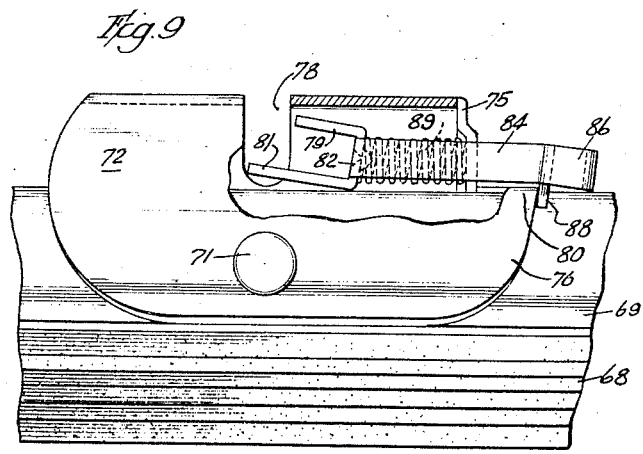
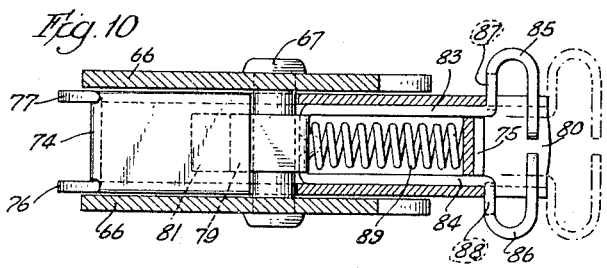
Inventor.
Theodore J. Smulski Patented Dec. 16, 1947

2,432,689

UNITED STATES PATENT OFFICE 2,432,689

AUTOMATIC BLADE CLIP

Theodore J. Smulski, Gary, Ind., assignor to Productive Inventions, Inc., a corporation of Indiana Continuation of application Serial No. 432,377, filed February 26, 1942. This application filed April 12, 1944, Serial No. 530,628

21 Claims. (Cl. 15—250)

My invention relates to windshield wiper mountings are more particularly to a windshield wiper mounting arrangement for conveniently and securely locking in connected cooperative relationship a windshield wiper arm and a windshield wiper blade.

A windshield wiper assembly comprises a motor which generally is mounted within the body of the vehicle, and a wiper blade actuating means which is provided with an actuating shaft extending to the exterior of the vehicle in proximity to a windshield. On the oscillating actuating shaft there is mounted a blade carrying arm which is provided at the free end thereof with a windshield wiper blade. Since wear and deterioration of the elements reduce the efficiency of the wiping element of the wiper blade, wiper blades are replaced, and hence, it has been customary in the past to provide some form of mounting between the free end of the wiper arm and the frame of the windshield wiper blade so as to permit ready detachment of the wiper blade. In the past, particularly in the case of automobiles, it has been customary to provide some form of connection which corresponds generally to a hook and eye arrangement.

While such hook and eye arrangements provide the desired convenience of replacement of the wiper blade they all have two disadvantages. When the vehicle is traveling at high speeds the air flow against the windshield sometimes lifts the arm and blade off the glass sufficiently to permit the blade to be blown off the arm and lost. Another disadvantage is that as an incident of the lifting of the arm and blade to permit hand cleaning of the windshield, as at service stations, the blade frequently falls off the hook causing inconvenience and sometimes loss, and often marring the finish of the car as it strikes it, not to mention the damage to the blade which is likely to result from such a fall. The wiper arm usually carries a spring which subjects the back of the blade to pressure to keep it in contact with the glass. Due to the relatively low power obtainable from windshield wiper motors there is rather a definite limit to the amount of pressure that can be applied without stalling the motor. These pressure limits are not sufficiently high to prevent air flow from lifting the blade off the glass under all conditions. The advent of air-flow design in automobiles involving sloping windows increased this tendency of the arms to lift and permit the blade to be disconnected and to be blown off the arm.

In the operation of aircraft the air flow of course is much more intense and while the somewhat more powerful windshield wiper motors used on aircraft permit relatively greater spring pressure applied to the blade there is a limit to the amount of pressure that can be practicably applied; and there exists also in aircraft even a more critical problem of preventing the blade from blowing off the arm. This problem is more critical because, particularly in aircraft employed in war, the loss of a wiper blade in flight may bring serious consequences both from reduced vision and from the danger of the blade striking the propellers and thus causing sufficient damage to completely disable the craft.

So it appears that both in vehicles for land travel and in aircraft there exists a need for a wiper blade and arm assembly which will first securely lock the blade to the arm and which will next provide that hinged relationship between the arm and blade necessary to permit the blade throughout its length to conform to the windshield.

A third problem is introduced involving the human element. Wiper blades wear out or deteriorate from other causes and must be replaced much more frequently than wiper arms. The hook and eye arrangement involves no particular skill or caution on the part of the operator making the replacement. However, with a locking assembly of the blade with the arm the blade must be manually unlocked from the arm for replacement of the blade and then what is critically important, the replacement blade must be securely relocked to the arm. Thus any locking arrangement which required any skill or caution on the part of the operator would inevitably at times be left unlocked through carelessness or ignorance of the operator.

The task of replacing a windshield wiper blade on aircraft frequently is difficult because of the relative inaccessibility of the blade and arm assembly and the inconvenience of reaching that assembly with both hands at the same time. It therefore becomes important that a locking assembly be provided which can be operated conveniently with one hand and without the use of any tools.

It is therefore a purpose of my invention to provide a blade and arm assembly which requires a minimum of skill for unlocking the blade from the arm and which requires absolutely no skill or attention to lock the replacement blade to the arm and which performs its own locking function automatically and without fail upon placing the arm and the replacement blade in operative relationship.

It is an object of my invention to provide a new and improved wiper mounting which cannot become accidentally detached.

Another object of my invention is to provide an improved wiper mounting which is manually detachable for inspection of the condition of the wiper blade and for replacement of the wiper blade where desired.

Still another object of my invention is to provide an improved wiper mounting which can be unlocked and relocked conveniently by the employment of one hand of the operator and without the use of any tools.

The present application is a continuation of my application Serial No. 432,377, filed February 26, 1942 for Automatic blade clip, the subject matter of the earlier application having been transferred to the present application. Other types or forms of connectors or clips are disclosed and claimed in my copending applications Serial No. 492,252 filed June 25, 1943, for Windshield wiper arm and blade connectors; Serial No. 523,-445 filed February 22, 1944 for Windshield wiper blade connectors; Serial No. 662,862 filed April 17, 1946 for Means for connecting a windshield wiper unit to an arm unit; and in an application of John W. Anderson, Serial No. 673,098 filed May 29, 1946 for Connection means between operating and operated units, owned by my assignee.

Other and further objects of my invention will become more readily apparent by reference to the following description taken in connection with the accompanying drawing, wherein:

Figure 1 is a view showing a portion of the wiper arm, a portion of the wiper blade, and the wiper mounting interconnecting the blade and arm;

Figure 2 is an end view of the assembly shown in Figure 1;

Figure 3 shows the locking apparatus arranged preparatory to engagement with the engaging member;

Figure 4 is a top view in partial cross-section of the assembly shown in Figure 3;

Figure 5 is an end view of a portion of the locking frame and movable locking member shown in Figure 3;

Figure 6 is a perspective view of the spring actuated movable locking member or bolt;

Figure 7 is a perspective view of the locking member;

Figure 8 is a blade and arm assembly embodying a modification of my invention;

Figure 9 is a view of the modification of Figure 8 in a position preparatory to engagement with an engaging member;

Figure 10 is a top view in partial cross-section of the arrangement shown in Figure 8; and Figure 11 is an end view of Figure 8.

The present invention is particularly suited to fulfill the exacting requirements of the wiper mounting on aircraft, and hence, the invention has been shown arranged particularly for such installation, although upon reading the following description it will become apparent to those skilled in the art that the locking apparatus may be connected to the arm and the engaging member may be connected to the frame of the blade.

Referring to Figures 1 to 7, and more particularly to Figures 1 and 2 it will be seen that there is provided at the free end of a wiper arm 21 a connector member 22 having a base 23 secured to the free end of the arm by any suitable fastening means such as a rivet 24 in order to prevent rotation of the base 23. With respect to the arm 21 there is provided at one extremity a lug 25 which is inserted into an opening 26 in the arm 21. The base 23 of the connector member 22 supports a plurality of spaced apart depending members 27 which are adapted to engage the sides of a frame of the locking member which in the present showing is mounted upon the frame of the wiper blade. At an intermediate point on the depending portions 27 there is provided a transversely positioned cross connector member 28 which may be formed by bending inwardly into the channel like portion of the depending members 27 two small lugs. The lugs form a member for insertion into, and hinged engagement with a locking member which is mounted on the frame of the wiper blade.

Referring more particularly to Figures 1 to 4 it will be seen that a wiper blade having a flexible wiper element 29 and a frame 31 is provided with a locking apparatus 32 secured to the frame 31 by a suitable fastening means such as a bolt or rivet 33. The locking apparatus 32 comprises a frame having a top 34, depending ends 35 and 36, and depending sides 37 and 38 which sides embrace the blade frame 31. The top 34 and the depending sides 37 and 38 are provided with a transverse entranceway or slot 39 which is adapted to receive the transverse member 28 of the engaging member 22. In the space between the top of the blade frame 31 and the top 34 of the locking apparatus frame there is positioned a spring actuated latch or movable member 41 which in the position shown in Figure 1 will prevent disengagement of the wiper blade from the wiper arm since its normal position is to close the transverse entranceway 39. The bolt or movable member 41 which is shown in perspective in Figure 6 is part of a member having two sliding side portions 42 and 43 which terminate in handle portions 44 and 45. The movable member 41 is at right angles to the connecting portion 46 which extends transversely between the side portions 42 and 43. The side portions 42 and 43 adjacent the handle portions 44 and 45 are of lesser dimensions so that these portions may slide through suitable openings in the end 35 of the frame of the fastening or locking apparatus. The degree of movement of the side members 42 and 43 therefore will be limited by the engagement of the step portions 47 and 48 of the side members against the end 35 of the locking apparatus frame. Adjacent the other ends of the side members 42 and 43 in the proximity of the transverse portion 46 and the movable member or bolt 41 there are provided notches 49 and 51 which are adapted to receive the ears 52 and 53 of a catch member shown in perspective in Figure 7.

The catch member shown in Figure 7 comprises a base 54 having an upstanding end portion 55 on which are the ears 52 and 53. At the other extremity of the base 54 there are provided two upstanding members 56 and 57 which in the position shown in Figure 1 extend to the exterior of the end 36 of the locking apparatus frame. The extremities of the upstanding portions 56 and 57 are reduced in dimension so as to form the shoulders 58 and 59 which in the position shown in Figure 3 engage a portion of the end 36 of the locking apparatus frame which is also shown in Figure 5. The catch member shown in perspective in Figure 7 has its upstanding portion 55 positioned adjacent the cross member 46 of the movable bolt assembly so that the ears 52 and 53 are positioned within the notches 49 and 51. A suitable spring 61 is positioned between end wall 35 of the frame of the locking apparatus and the upstanding end 55 of the catch. The upstanding end 55 may be provided with a projection 62 so as to position this spring 61 thereby causing it to apply the proper force against the end member 55 of the catch and the transverse member 46 of the movable locking member or bolt 41.

In order to detach the blade from the arm 21 the handle portions 44 and 45 are grasped and withdrawn to the position shown in Figure 3. The movable locking member or bolt 41 is withdrawn from its position across the transverse entranceway or recess 39 thereby permitting the transverse member 28 of the engaging assembly 22 to be withdrawn from the locking apparatus. When the bolt 41 is withdrawn to the position shown in Figure 3, the angle of the transverse member 46 and the end portion 55 is such as to raise the base 54 of the catch across the bottom of the transverse entranceway 39. At the same time the shoulders 58 and 59 of the catch engage the upper portion of the end wall 36 of the frame 32 thereby retaining the latch bolt 41 in retracted position. The position of the elements shown in Figure 3 is the position which must be obtained before the blade can be attached to the locking assembly on the wiper arm 21. As soon as the transverse member 28 of the locking assembly 22 engages the raised base portion 54 of the catch which is in the position shown in Figure 3, the base portion 54 will be moved inwardly thereby lowering the shoulder portions 58 and 59 of the upstanding members 56 and 57 sufficiently so that these latter members may be urged to the exterior of the end wall 36 of the locking apparatus. When this occurs the bolt 41 is moved into the space between the transverse member 28 and the base 23 of the assembly 22 thereby positively latching the two assemblies together to prevent any accidental disengagement of the wiper blade from the wiper arm.

In a modification of my invention illustrated in Figures 9 to 11 and more particularly in Figure 8 there is shown a windshield wiper arm 63 having at the free end thereof a blade attachment member 64 pivotally mounted by means of a rivet 65. This blade attachment means may be of the type which can be angularly positioned to one side or the other with respect to the arm thereby to permit the wiper blade to be aligned with the frame of the windshield when the arm 63 is in the parked position. An attachment of this type is described and claimed in an application for United States Letters Patent by John W. Anderson, Serial No. 282,008, filed June 30, 1939 for a Windshield wiper arm, which has been matured into Patent No. 2,290,140 dated July 14, 1942. In wiper arm assemblies of the parallelogram type, the base of the blade attaching member 64 may be attached to or may be an integral part of one of the arms of the parallelogram arrangement which operates to hold the wiper blade throughout its operating travel in a predetermined direction with respect to the windshield. In the present instance the blade attaching member 64 which has a pair of depending side members 66 is provided with a transverse member 67 which may comprise a rivet or bolt extending from one of the depending sides 66 to the other depending side. The transverse member 67 thereby forms an engaging member for cooperation with a locking apparatus which is attached to the frame of a windshield wiper blade.

Figures 8, 9 and 10 show a windshield wiper blade for a wiping element 68 supported within a frame 69. The frame 69 has secured thereto by means of a rivet or bolt 71 a locking apparatus 72. The locking apparatus 72 comprises a frame having a base or top 73 from which there are depending end members 74 and 75, and depending side members 76 and 77. The frame of the locking apparatus 72 is provided with a transverse entranceway or slot 78 into which the engaging member 67 may be inserted. A U-shaped member having a portion 79 serving as a movable locking member or latch bolt and a parallel portion 81 serving as a catch release is arranged for reciprocal movement across the entranceway or recess 78. The bolt 79 and the catch release portion 81 may be formed from an integral piece of metal which has a connecting portion 82. A pair of elongated strips 83 and 84 extend from the cross piece 82 to a pair of handle portions 85 and 86. Adjacent the lower portions of the handles 85 and 86 there is provided a pair of lugs 87 and 88 which in the position shown in Figure 9 engage a rearwardly extending portion connected between the side portions 76 and 77 thereby to hold the bolt 79 in retracted position. The one end wall 75 is preferably of such configuration as to provide a seat for a spring 89 positioned between the end wall 75 and the back of the cross piece 82 which interconnects the latch bolt 79 and the catch release 81.

In order to remove the wiper blade from the arm 63 shown in Figure 8 the handle 41 formed of the handle portions 85 and 86 is grasped and moved to the dotted line position shown in Figure 8. At this position the bolt 79 is retracted sufficiently to permit the blade to be disengaged from the arm by withdrawing the engaging member 67 from the slot 78. When the handles 85 and 86 are moved to the dotted line position shown in Figure 8 they may be moved downwardly so that the catch members 87 and 88 will engage the transverse member 80 which interconnects the side portions 76 and 77 of the frame 72 thereby holding the bolt 79 in retracted position. Due to the angular relation between the bolt 79 and the handles 85 and 86, the bolt 79 will assume the position shown in Figure 9 when the catch members 87 and 88 restrain the movable locking member or bolt 79 in retracted position. It furthermore will become apparent that the catch release portion 81 has been raised to an intermediate position in the transverse entranceway or slot 78. Therefore whenever an engaging member such as the transverse bolt or rivet 67 shown in Figure 8 or the transverse member 28 shown in Figure 1 is inserted in the entranceway 78 so as to engage the catch release 81, the pressure of the arm and engaging member will tip the longitudinal members 83 and 84 interconnecting the catch release 81 with the catch portions 87 and 88 so that these latter catch portions no longer engage the transverse portion 80 thereby permitting the spring 88 to move the movable locking member 79 across the entranceway 78 to latch together the locking member 72 and the engaging assembly 64. While the arrangement shown in Figures 8 to 11 is somewhat similar as that shown in Figures 1 to 7, it does not have the advantage of automatically restraining the latch whenever the latch is withdrawn from the transverse entranceway, but it does have the essential safety feature of positively latching the blade to the arm whenever the engaging member is inserted in the transverse slot of the locking apparatus. It furthermore will be obvious, particularly for use on automobiles, it may be satisfactory to provide the free end of the wiper arm with the locking member, and the blade frame with the engaging member thereby materially reducing the cost of manufacture of replacement blades.

While I have shown and described my invention as embodied in certain specific assemblies, it is to be understood that I do not wish to be limited thereto since the principles involved are susceptible of other embodiments, and modifications may be made in the instrumentalities employed without departing from the spirit and scope of my invention as set forth in the appended claims.

I claim:

1. In a windshield wiper arm and blade assembly, in combination, a windshield wiper arm element and a windshield wiper blade element adapted to be operably positioned between the free end of said arm element and the windshield, one of said elements being provided with a transverse engaging member adapted to hingedly engage locking apparatus carried by said other element, said locking apparatus including a receiving member having two substantially parallel sides recessed to provide an opening for receiving said engaging member, a movable member adapted to position a portion thereof to block the opening to prevent the removal of said engaging member from said opening, a spring adapted to resist the displacement of said movable member from such position, and a means for moving said movable member and said portion thereof away from said opening to permit the removal from said opening of said engaging member.

2. In a windshield wiper arm and blade assembly, in combination, a windshield wiper arm and a windshield wiper blade, said arm carrying adjacent its free end an entering member adapted to be hingedly engaged by apparatus carried by said blade, said apparatus including a substantially channel-shaped clip member attached to said blade, said clip member being recessed to receive said entering member carried by said arm, a movable member normally carried by said clip and adapted to assume alternately a locking position and an unlocking position, said movable member having a portion adapted when in locking position to block the open side of said recess to retain said entering member of said arm within said recess, spring means within said clip adapted to move said movable member from unlocking position to locking position, and handle means for moving said movable member from locking to unlocking position.

3. A wiper blade connector apparatus for connecting the wiper arm and wiper blade members of a windshield wiper to one another, said connector apparatus adapted to be affixed to one of said members and to cooperate with a cross connector affixed to the other of said members for automatically effecting a quickly separable but normally positively maintained connection of the blade and arm members and comprising, in combination, a body member having a notch for receiving said cross connector, a locking member carried by the body member for movement transversely of the notch between a locking position in which it projects across the notch entrance and positively blocks the notch entrance and an unlocking position in which it stands clear of the notch, a spring for resiliently urging the locking member to locking position, detaining means cooperative with the body member to hold the locking member cocked in unlocking position, a cocking handle for moving the locking member from locking to unlocking position, and tripping means engageable and automatically operable by the transverse connector as an incident of the insertion of the latter in the notch to trip the locking member from its cocked condition and cause it to be operated by the spring to locking position.

4. In a windshield wiper blade adapted for automatic positive attachment to a wiper arm which includes a cross connector, comprising the combination with a wiper blade frame, of a clip affixed thereto and provided with a notch for receiving said cross connector, a locking member carried by the clip for movement transversely of the notch between a locking position in which it projects across the notch entrance and an unlocking position in which it stands clear of the notch, a trigger member rockingly connected with the locking member, a spring engaging the trigger member and urging it in a direction to move the locking member to locking position, said trigger member and clip having cooperative parts for detaining the trigger member in a cocked condition, a cocking handle for operating the locking member from locking to unlocking position against the force of said spring and for concomitantly shifting and rocking the trigger member to its cocked condition as an incident of such operation to detain the locking member in unlocking position, the trigger member including a tripping portion which extends across the inner portion of the notch when in cocked condition in position to be engaged and rocked by the cross connector to trip the trigger member when the cross connector is inserted in the notch and pressed against said tripping portion.

5. In a windshield wiper including wiper arm and wiper blade members, the novel apparatus for automatically effecting a quickly separable but normally positively maintained connection of the blade and arm comprising, in combination, a cross connector secured to one of said members, a connector secured to the other of said members provided with a transverse recess adapted to receive the cross connector, a locking member carried by the recessed connector for movement transversely of the recess between a locking position in which it extends across the recess and positively blocks the entrance thereof to prevent withdrawal of the cross connector from the recess, and an unlocking position in which it stands clear of the recess to free the cross connector, a spring urging the locking member toward locking position, and a handle for operating the locking member from locking to unlocking position to free the cross connector.

6. In a windshield wiper arm and blade component assembly, a male connecting member attached to one of said components, a female connecting member rigidly attached to the other of said components, the female connecting member having a notch, and the male member being constructed and arranged to engage said notch, a latch carried by the female member and having a part adapted to be moved with relation to said member into a position to block the notch to retain the male member therein.

7. In a windshield wiper mechanism, having arm and blade component members, in combination, readily engageable and detachable mechanism for connecting said members in operative relationship, said mechanism consisting of a female connector attached to one of said members and including a pair of parallel spaced sides each having a recess formed in it, and a male connector attached to the other of said members and including a pair of parallel spaced sides and intervening male connecting means carried by said sides and disposed between them, said parallel depending sides of the male connector being spaced to embrace the parallel spaced sides of the female connector and to locate the male connecting means in the recesses of the latter, and detaining means carried by the female connector and movable transversely of the recesses into a position for positively opposing accidental removal of said male connecting means from said recesses, said male connector means being removable from said recesses by direct manual adjustment of said detaining means.

8. In a windshield wiper arm and blade component assembly, a male connecting member forming a permanent part of one of said components and extending transversely thereof, a female connecting member rigidly connected to and forming a permanent part of the other of said components, the female connecting member having a transverse bearing opening adapted to hingedly receive the male member for relative movement about a transverse axis, and a spring latch permanently secured to one of said components for positively preventing withdrawal of the male member from said bearing opening until released by said latch.

9. In a windshield wiper blade assembly, a housing connecting member forming a permanent part of said blade assembly, said housing connecting member having a recess constructed and arranged to receive a male connecting member of a wiper arm in a manner whereby the blade assembly and housing may pivot with respect to said male connecting member, a spring latch disposed in the housing member and having a part adapted to be moved with relation to said member into a normal retaining position within at least a part of the path transversed by said male member for detaining said male member against disengagement from said recess when received therein, and a handle for manually withdrawing said part from detaining position.

10. A clip for connecting a windshield wiper blade to operating means comprising a member provided with a pair of opposed spaced abutments, a locking element slidably related to said abutments, a compression spring actable when at least partly expanded to position the element to lock a detachable entering part for pivotal movement between said abutments, and means whereby the element may be withdrawn and held in a normal predetermined cocked position to permit free entry of the part between said abutments.

11. In a wiper mounting, the combination of a wiper arm element, a wiper blade element, and means for locking said elements together in hinged cooperative relation, said means comprising an apparatus attached to one of said elements and a cooperating male pivot member attached to the other of said elements and adapted to be engaged by said apparatus, said apparatus comprising a frame having a recessed entranceway for receiving said male pivot member, a spring-biased locking member mounted upon said frame for cooperation with said entranceway, means for moving said locking member to unlocking position, and means for retaining said locking member in unlocking position, said locking member being responsive to the introduction of said male pivot member in said entranceway for moving said locking member to locking position, said locking member having a portion adapted to engage said male pivot member to lock said member within said entranceway.

12. In a windshield wiper assembly, the combination comprising a wiper arm element, a wiper blade element, and means for locking said elements together in hinged cooperative relationship, said means comprising an apparatus attached to one of said elements and a cooperating male pivot member attached to the other of said elements and adapted to be engaged by said apparatus, said apparatus comprising a channel frame member having in each side thereof a recessed entranceway for receiving said male pivot member, a spring-actuated locking member mounted upon said frame so that in locking position a portion thereof is positioned to block the opening of said entranceway, means for moving said locking member to unlocking position, means for retaining said locking member in unlocking position, said locking member being supported by said frame so as to have a combined longitudinal and pivotal movement when moved from unlocking position to locking position, and means responsive to the insertion of said male pivot member within said entranceway for freeing said locking member from the detaining action of said retaining means to cause said locking member to be spring urged to locking position and to hold said male pivot member into locking position.

13. In a connector mechanism for use in connecting the wiper arm and wiper blade components of a windshield wiper to one another, in combination, a U-shaped connector member permanently secured to one of the windshield wiper components referred to, said connector member including spaced side walls formed with notches for receiving a cross connector attached to the other of said windshield wiper components, and a spring latch permanently connected with said connector member, comprising a hook-like retaining member disposed within the U-shaped connector member and movable transversely of the notch between a normal retaining position in which it obstructs the notch entrance to oppose withdrawal of the cross connector and a non-retaining position in which it substantially clears the notch entrance, and a handle constructed and arranged for withdrawing the retaining member from retaining position.

14. A mechanism for use in connecting the wiper arm and wiper blade components of a windshield wiper to one another comprising a female connector adapted to be secured to one of the components and having a notch adapted to receive a male connector adapted to be attached to the other of said components, and a spring latch comprising a part normally associated with the female connector and being movable transversely of the notch between a normal retaining position in which it obstructs the entrance of the notch to oppose withdrawal of the male connector adapted to be received therein and to a non-retaining position in which it substantially clears the entrance of the notch, and a handle constructed and arranged for withdrawing the retaining member from retaining position.

15. A clip for connecting a windshield wiper blade to operating means comprising a member provided with an opening, and a spring pressed locking element withdrawn to a normal cocked position to permit free entry of a part to be pivotally held in said opening, said element being constructed and arranged to be released for projection with respect to the opening to lock the part in said opening when directly engaged by said part.

16. A clip for establishing a connection between a windshield wiper blade member and an operating arm member comprising channel guide means adapted to be secured to one member, an opening in said guide means, a locking element associated with said guide means and having an opening, means for moving said locking element to one position whereby to provide for free entry of a part into said first opening and movable to another position to lock the part in said openings after the same is received therein.

17. Connection means for use in attaching a windshield wiper blade member to a windshield operating member comprising a channel adapted to be carried by one member, locking means movable in said channel adapted to receive a part adapted to be carried by the other member, stop means on said channel, resilient means pressing said locking means against said stop means to place the locking means in a cocked position so that the part may be freely received therein and after being received may be directed to cause the locking means to become disengaged from said stop means to uncock the locking means to entrap the part.

18. A clip for connecting a windshield wiper blade to operating means comprising a member, stop means, resilient means, a tiltable locking element, operating means connected to said element for compressing said resilient means and retracting said element to engage said stop means to place the element in a cocked position, an opening provided in said member for receiving a part in a manner whereby the part may be caused to tilt the element to disengage it from said stop means to project the element in a direction to lock the part in place.

19. Connector means for connecting a windshield wiper blade unit to an arm unit, said connector means being adapted to be attached to one of said units and constructed for the reception of an entering part on the other unit, and yieldable holding means associated with said connector means and provided with means for receiving said entering part when it is received in said connector means whereby to assist in holding the connector means pivotally connected to said entering part.

20. Connector means for connecting a windshield wiper blade unit to an arm unit, said connector means being adapted to be carried by a support attachable to one of said units, said connector means including a housing having a pair of spaced apart side walls provided with recesses, and yieldable holding means arranged between said walls and constructed to receive an entering part on the other unit when such part is disposed in said recesses in a manner whereby said connector means may pivot with respect to such part.

21. Connector means for connecting a windshield wiper blade unit to an arm unit, said connector means being adapted to be attached to one of said units and constructed for the reception of a pivotal entering part adapted to be carried by the other unit, and yieldable holding means associated with said connector means and provided with means for receiving said entering part when it is received in said connector means whereby to assist in holding the connector means pivotally connected to said entering part.

THEODORE J. SMULSKI.

REFERENCES CITED

The following references are of record in the file of this patent:

UNITED STATES PATENTS

| Number | Name | Date |
|---|---|---|
| 1,943,652 | Christen | Jan. 16, 1934 |
| 2,270,589 | Hansen | Jan. 20, 1942 |
| Re. 8,925 | Potts | Oct. 7, 1879 |
| 2,240,369 | Horton | Apr. 29, 1941 |
| 1,546,950 | Stuart | July 21, 1925 |
| 1,371,363 | Gillet | Mar. 15, 1921 |